United States Patent
Gage et al.

(10) Patent No.: US 9,884,627 B1
(45) Date of Patent: Feb. 6, 2018

(54) DEVICE AND METHOD FOR ADJUSTING VEHICLE FUEL EFFICIENCY BASED ON AN ALTERED VEHICLE SURFACE AREA

(71) Applicant: Toyota Motor Engineering & Manufacturing North America, Inc., Erlanger, KY (US)

(72) Inventors: Sergei I. Gage, Redford, MI (US); Arata Sato, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 15/224,558

(22) Filed: Jul. 31, 2016

(51) Int. Cl.
*B60W 30/18* (2012.01)
*F02D 9/08* (2006.01)
*B60W 30/182* (2012.01)
*B60W 10/06* (2006.01)
*B60W 10/11* (2012.01)
*B60W 40/12* (2012.01)
*B60W 40/02* (2006.01)
*F02D 13/02* (2006.01)

(52) U.S. Cl.
CPC .......... *B60W 30/182* (2013.01); *B60W 10/06* (2013.01); *B60W 10/11* (2013.01); *B60W 40/02* (2013.01); *B60W 40/12* (2013.01); *F02D 9/08* (2013.01); *F02D 13/02* (2013.01); *B60W 2300/12* (2013.01); *B60W 2400/00* (2013.01); *B60W 2422/00* (2013.01); *B60W 2530/16* (2013.01); *B60W 2550/12* (2013.01); *B60W 2710/0605* (2013.01); *B60W 2710/1005* (2013.01)

(58) Field of Classification Search
CPC ............ F02D 9/08; F02D 13/02; F02D 29/02; B60W 10/06; B60W 10/11; B60W 30/182; B60W 40/02; B60W 40/12; B60W 2300/12; B60W 2400/00; B60W 2422/00; B60W 2530/16; B60W 2550/12; B60W 2710/0605; B60W 2710/1005; Y02T 10/126; Y02T 10/44; Y02T 10/52; Y02T 10/54; Y02T 10/56
USPC ........ 701/49, 99, 102–104, 115; 296/100.11, 296/100.15, 100.16, 136.03, 180.1–180.5, 296/190.04, 217
See application file for complete search history.

(56) References Cited

U.S. PATENT DOCUMENTS

| | | | |
|---|---|---|---|
| 9,193,306 B2 * | 11/2015 | Espig | ...................... B60R 9/055 |
| 9,290,077 B2 | 3/2016 | Newman et al. | |
| 2002/0016653 A1 * | 2/2002 | Levine | ................... B60K 28/16 |
| | | | 701/1 |

(Continued)

*Primary Examiner* — Hung Q Nguyen
*Assistant Examiner* — Johnny H Hoang
(74) *Attorney, Agent, or Firm* — Christopher G. Darrow; Darrow Mustafa PC (57) ABSTRACT

A device and method for adjusting vehicle fuel efficiency to responsive to an altered vehicle surface area are disclosed. An operation of the method receives vehicle surface data, which indicates a transition from a first vehicle drag coefficient value relating to a vehicle surface area to a second vehicle drag coefficient value relating to the altered vehicle surface area. A second plurality of powertrain parameter values associated with the second vehicle drag coefficient value are determined, and the method operates to transmit the second plurality of powertrain parameter values for adjusting of the vehicle fuel efficiency.

20 Claims, 5 Drawing Sheets

(56) References Cited

U.S. PATENT DOCUMENTS

| | | | |
|---|---|---|---|
| 2004/0031639 A1* | 2/2004 | Deves | B62D 33/03 |
| | | | 180/311 |
| 2006/0006701 A1* | 1/2006 | Wells | B60J 7/0573 |
| | | | 296/223 |
| 2007/0035154 A1* | 2/2007 | Eisenreich | B60J 7/0573 |
| | | | 296/107.01 |
| 2007/0112494 A1* | 5/2007 | Naik | B60K 31/0008 |
| | | | 701/55 |
| 2008/0088151 A1 | 4/2008 | Shagbazyan | |
| 2009/0255775 A1* | 10/2009 | Viaud | A01F 21/00 |
| | | | 192/135 |
| 2013/0013140 A1* | 1/2013 | Boehme | B60W 10/30 |
| | | | 701/22 |
| 2016/0016525 A1 | 1/2016 | Chauncey et al. | |
| 2016/0039418 A1 | 2/2016 | Wall et al. | |
| 2016/0357262 A1* | 12/2016 | Ansari | G06F 3/017 |

* cited by examiner

FIG. 4
vehicle control unit 300

FIG. 5

DEVICE AND METHOD FOR ADJUSTING VEHICLE FUEL EFFICIENCY BASED ON AN ALTERED VEHICLE SURFACE AREA

BACKGROUND

Fuel efficiency improvements for vehicles take several forms. On consideration is the activity included in the operation vehicle, including whether a driver operates a vehicle aggressively or conservatively, the rate of velocity, acceleration characteristics, and the like. Another aspect relate to the vehicle, including the vehicle weight and energy to move from a stopped position, to the resistance with which the wheels turn, the aerodynamics of the vehicle, the vehicle frontal area profile, etc. With respect to aerodynamics, the vehicle drag coefficient contributes to the power demand. Different surfaces and/or accessories affect a vehicle's baseline drag coefficient. Accordingly, though the vehicle fuel efficiency is optimized for a baseline operation, changes to the area may affect consumption by too much or too little fuel to operate the vehicle. It is desirable to adjust a vehicle fuel efficiency based on an altered vehicle surface area.

SUMMARY

A device and method for adjusting vehicle fuel efficiency to responsive to an altered vehicle surface area are disclosed.

In one implementation, a method in a vehicle control unit for adjusting vehicle fuel efficiency to address on an altered vehicle surface area is disclosed. In the method, the vehicle control unit receives vehicle surface data, which indicates a transition from a first vehicle drag coefficient value relating to a vehicle surface area to a second vehicle drag coefficient value relating to the altered vehicle surface area. The method determines a second plurality of powertrain parameter values associated with the second vehicle drag coefficient value, transmits the second plurality of powertrain parameter values for the adjusting of the vehicle fuel efficiency.

In another implementation, a vehicle control unit for controlling vehicle fuel efficiency responsive to an altered vehicle surface area is disclosed. The vehicle control unit includes a wireless communication interface, a processor, and memory. The wireless communication interface is operable to service communication with a vehicle network and with user equipment of a vehicle user. The processor is coupled to the wireless communication interface for controlling operations of the vehicle control unit. The memory is coupled to the processor. The memory is for storing data and program instructions used by the processor, where the processor configured to execute instructions stored in the memory to receive, via the wireless communications interface, vehicle surface data indicating a transition from a first vehicle drag coefficient value to a second vehicle drag coefficient value. The processor operates to determine a second plurality of powertrain parameter values associated with the second vehicle drag coefficient value, transmits the second plurality of powertrain parameter values for the adjusting of the vehicle fuel efficiency.

BRIEF DESCRIPTION OF THE DRAWINGS

The description makes reference to the accompanying drawings wherein like reference numerals refer to like parts throughout the several views, and wherein.

DETAILED DESCRIPTION

A device and method for providing a vehicle fuel efficiency target for each of multiple vehicle drag coefficients is described herein.

As may be appreciated, vehicle fuel consumption is based on the energy efficiency of a particular vehicle provided as a ratio of the distance traveled per unit of fuel consumed. A vehicle's fuel efficiency may be expressed in miles per gallon (mpg) or kilometers per liter (km/L). A vehicle's fuel consumption is the reciprocal of fuel efficiency, which may be expressed in liters per 100 kilometers (L/100 km) or gallons per mile.

The amount of fuel consumption may be based on several vehicle criteria relating to the vehicle powertrain (such as, an engine's efficiency to convert fuel to rotary motion, a setup of the engine, etc.), to the manner that the vehicle is operated (such as, acceleration, braking, velocity, etc.) and to environmental factors (such as, road pavement, slope, aerodynamics, etc.).

A vehicle's aerodynamics generally relates to, for example, the effect the vehicle's shape and/or profile has in the operating environment, such as resulting wind noise, an undesired lift force, and amount of drag. Aerodynamic drag relates to the resistance of the air to forward movement of a vehicle. Factors may include vehicle shape (such as frontal area, etc.), vehicle protrusions (for example, mirrors, bumpers, antennas, etc.), turbulence at the vehicle rear, friction with the vehicle exterior, etc.

A vehicle drag coefficient may relate to a measure of the nature of the air passing over the front of a vehicle, which may be determined under standardized conditions, such as a wind tunnel with a capability to mimic road conditions. In general, the lower a vehicle's drag coefficient, the more aerodynamic, or slippery, the vehicle.

In general passenger vehicles, fuel efficiency may be a factor because of vehicle operating expenses. For example, the lower the fuel efficiency, the increase in operating expenses due to more frequent vehicle refueling. A comparatively larger vehicle's drag coefficient corresponds to lesser fuel efficiency generally, and more so at speed, because the amount of drag force increases exponentially with a vehicle's speed. As may be appreciated, a lower vehicle drag coefficient is improving vehicle speed and fuel efficiency, for example.

For general comparison, average passenger vehicles may have drag coefficients between 0.30 and 0.35. Larger utility vehicles, such as SUVs, light duty trucks, etc., having typically boxy shapes with blunt frontal areas, large extending mirrors, tailgates, etc., may have drag coefficients generally of about 0.35 to 0.45.

As may be appreciated, however, higher-performance vehicles, and the associated consumers, may desire performance over economy. For example, a high-performance vehicle, such as a sports car, may have a high (to a very high) drag coefficient to compensate for a vehicle's uplift force (that is, the tires losing contact with the road) at speed.

Accordingly, the amount of fuel consumption and a vehicle drag coefficient are interrelated. To optimize and/or improved fuel efficiency, an engine control unit is configured control the vehicle powertrain performance based on a vehicle's baseline parameters, which include the vehicle's drag coefficient.

However, a vehicle's aerodynamics may change, such as with utility vehicles, when items are hauled or transported (such as campers, recreational boating equipment, construction materials, etc.). As a result, the change in profile changes the vehicle's drag coefficient. Because the drag coefficient changes, the vehicle powertrain performance also changes because an underlying baseline parameter changes. For example, a fuel/oxygen mixture may have excessive fuel, or not enough fuel. In turn, a resulting fuel efficiency does not approach the ideal or target, and overall, is diminished.

Figure 1A:
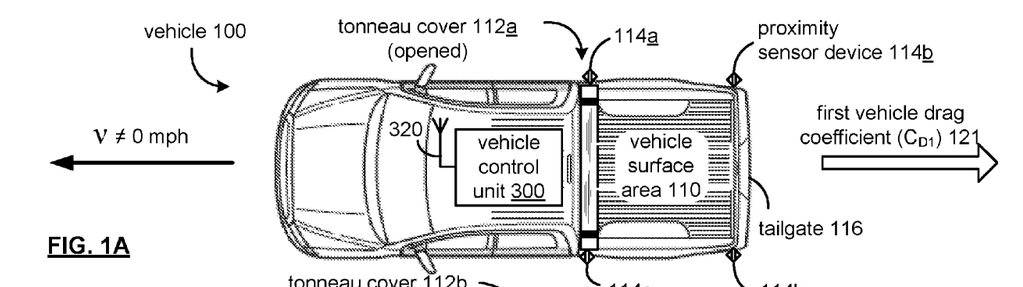
FIGS. 1A-1C is a block diagram of a vehicle illustrating a transition from a first vehicle drag coefficient to a second vehicle drag coefficient.
Figure 1B:
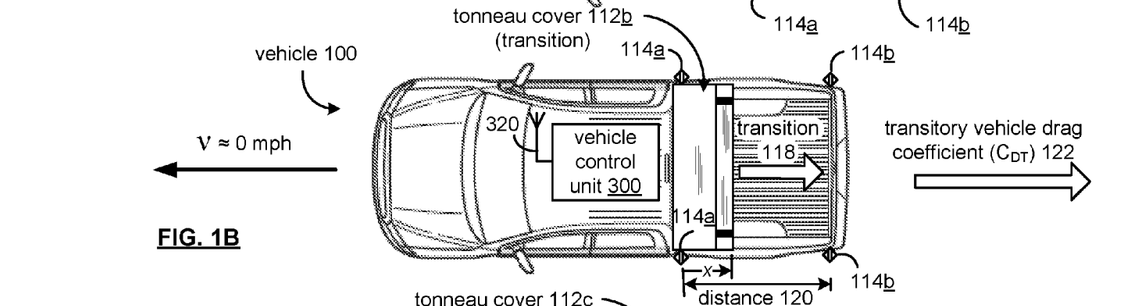
Figure 1C:
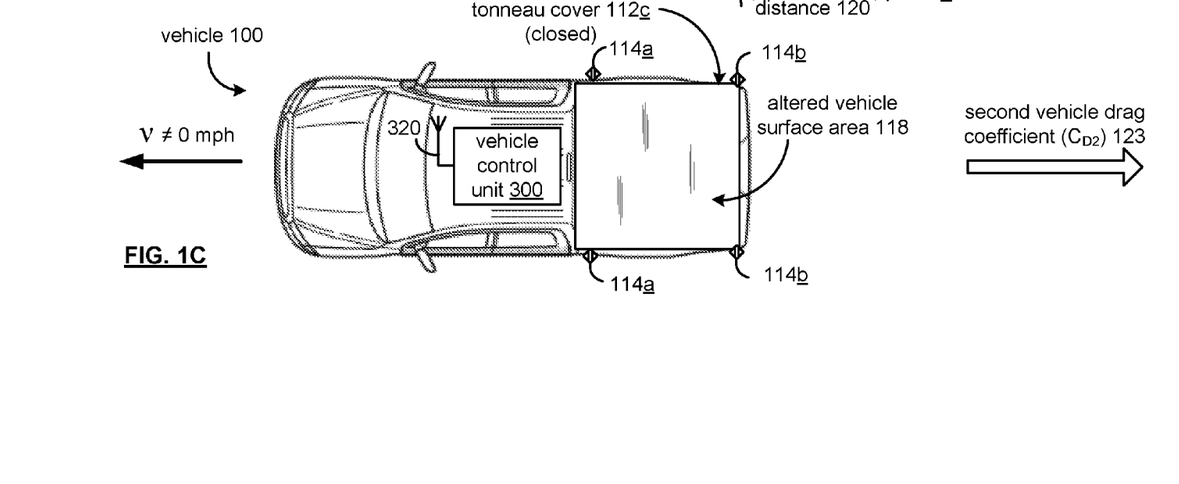

FIGS. 1A-1C is a block diagram of a vehicle 100 illustrating a transition from a first vehicle drag coefficient $C_{D1}$ to a second vehicle drag coefficient $C_{D2}$. As may be appreciated, either the first vehicle drag coefficient $C_{D1}$ or the second vehicle drag coefficient $C_{D2}$ may operate as a baseline drag coefficient $C_{Dbase}$ for the vehicle 100, in that, as the term is used, to indicate a minimum or starting point for a vehicle's fuel efficiency.

FIG. 1A illustrates a vehicle 100 that includes a vehicle control unit 300, a tonneau cover 112a (in an opened and/or undeployed position), and a plurality of proximity sensor devices 114a and 114b. The vehicle control unit 300 operates generally to receive sensor device input, and provide powertrain parameters based on the received sensor device input to the vehicle's powertrain, as is discussed later in detail herein with reference to FIGS. 2-5.

In the embodiment described, the vehicle control unit 300 provides powertrain parameters based on the first vehicle drag coefficient $C_{D1}$ to realize optimized and/or improved fuel efficiency by the vehicle 100.

In the example of FIG. 1A, the vehicle 100 is a pickup truck, having a bed or luggage area as indicated by vehicle surface area 110. As may be appreciated, an accessory or optional equipment may be a soft or flexible tonneau cover that may be selectively deployed to protect and/or conceal contents of the bed area, such as from moisture, sun exposure, theft, etc. Other such selectively deployed accessories may include rigid tonneau covers, paneled tonneau covers, tonneau covers having different materials and/or covering with different air friction characteristics. Also, as may be appreciated, the tailgate 116 may be operable in a first position (closed), and transition to a second position (opened) that results in an altered vehicle surface area, which also may affect a drag coefficient of the vehicle 100.

For clarity, the tonneau cover 112 and the affect to the vehicle drag coefficient values is discussed with the understanding that vehicle 100 may have one or more alterable vehicle surface areas. Also, with regard to examples of passenger vehicles, the vehicle 100 provides an example of a vehicle in which a difference in drag coefficient may realize a detectable effect on the vehicle's fuel efficiency.

Referring to FIG. 1A, the tonneau cover 112a is in an opened condition, as sensed by peripherally disposed proximity sensor devices 114a. Proximity sensor devices 114a and 114b may be provided as capacitive sensors, reflective sensors, etc., to detect the tonneau cover 112a in a first position. The vehicle 100, with the tonneau cover 112a in an opened (or undeployed) position has a first vehicle drag coefficient $C_{D1}$.

Generally, as the leading edge of the vehicle 100 penetrates the atmosphere, the air passes the surfaces on the top and underneath the vehicle 100. The shape of these surfaces determine the coefficient drag $C_D$ of the vehicle. With a blunt nose, the air becomes broadly separated as it travels over the top surface of the vehicle. Directly behind the cab, a low-pressure area develops as the airflow velocity begins to drop, and creates a high-pressure area after clearing the tailgate 116.

In operation, the vehicle control unit 300 operates to provide powertrain parameters responsive to the first vehicle drag coefficient $C_{D1}$. Accordingly, when the vehicle is in motion (e.g., v≠0 mph), the powertrain operates to achieve a fuel efficiency based on the first vehicle drag coefficient.

The term "powertrain" as used herein describes vehicle components that generate power and deliver the power to the road surface, water, or air. The powertrain may include the engine, transmission, drive shafts, differentials, and the final drive communicating the power to motion (for example, drive wheels, continuous track as in military tanks or caterpillar tractors, propeller, etc.).

The tonneau cover 112a may be selectively operated in a manual and/or remote fashion to cover the vehicle surface area 110. The opened tonneau cover 112a provides a layer density that is detectable by the proximity sensor devices 114a to indicate a stowed or undeployed state.

FIG. 1B illustrates the vehicle 100 that a tonneau cover 112b (in a transitional position), and a plurality of proximity sensor devices 114a and 114b.

To deploy and/or place the tonneau cover 112b from an opened state as provided by the example of FIG. 1A, as illustrated by the tonneau cover 112a, the tonneau cover 112b may be transition 118 from proximity sensor device 114a towards sensor device 114b. The transition 118 may be either in a manual and/or in an automated fashion, such as by a hydraulic or electric motor that may impart longitudinal motion x along the distance 120 of the vehicle surface area 110 (such as along a rail with edge catch, a worm-drive screw, a frame in a scissor arrangement, etc.). When being deployed, the sensor devices 114a and 114b may sense a decrease in the proximity density resulting from the transition 118 of the tonneau cover 112b.

As may be appreciated, as the tonneau cover 112b undergoes the transition 118 from the position of sensor devices 114a to the position of sensor devices 114b, a transitory vehicle drag coefficient $C_{DT}$ results at the displacement x between sensor devices 114a and 114b along the distance 120. In operation, the vehicle control unit 300 may operates to provide powertrain parameters responsive to the transitory vehicle drag coefficient $C_{DT}$.

However, other considerations may affect operation of the vehicle in the transitory state when in motion (e.g., v≠0 mph). For example, turbulence and forces acting on the tonneau cover may have the unintended consequence of removing the cover from the vehicle 100 altogether. Nevertheless, the principles that provide adjustment of the powertrain based on different vehicle drag coefficients may similarly apply to transitory positioning of the tonneau cover 112b along the distance 120 between sensor devices 114a and 114b.

FIG. 1C illustrates the vehicle 100 that a tonneau cover 112c (in a closed relation), and a plurality of proximity sensor devices 114a and 114b.

In FIG. 1C, the tonneau cover 112c is illustrated in a closed position, as sensed by tonneau sensor devices 114b, and as may be confirmed by a density sensing by the proximity sensor devices 114a. The tonneau cover 112c over the bed produces the altered vehicle surface area 118 (as contrasted with vehicle surface area 110). As airflow passes over the vehicle cab, the tendency is for a low-pressure area to develop adjacent the back of the cab. With the tonneau cover 112c over the bed (the vehicle surface area 110), and providing an altered vehicle surface area 118, the airstream deflects while traveling over the tonneau cover 112c.

The vehicle 100, with the tonneau cover 112c in a closed (or deployed) position produces a second vehicle drag coefficient $C_{D2}$, which is not equal or substantially similar to the first vehicle drag coefficient $C_{D1}$ of FIG. 1A.

In operation, the vehicle control unit 300 operates to provide powertrain parameters responsive to the second vehicle drag coefficient $C_{D2}$. Accordingly, when the vehicle is in motion (e.g., v≠0 mph), the powertrain operates to achieve a fuel efficiency based on the second vehicle drag coefficient $C_{D2}$.

Some inquiry into the general effect of altering the vehicle surface area 118 of a truck bed indicates a decrease in the drag coefficient by about a factor of eight, drawing a conclusion that a tonneau cover 114c would improve fuel efficiency of the vehicle. But fuel efficiency studies involving a tonneau cover indicate the vehicle fuel efficiency is adversely impacted, reducing a fuel efficiency by about four percent.

Generally, power demand for a vehicle 100 may be determined as:

$$\text{vehicle power demand} = mv[a(1+\epsilon) + (g)(\text{grade}) + (g)(C_R)] + 0.5\rho C_D A_F V^3$$

where, "v" is vehicle speed, "a" is acceleration, "g" is acceleration due to gravity (9.8 m/s$^2$), "$\epsilon$" is mass factor accounting for the rotational masses, grade is the grade of the road, "$C_R$" is rolling resistance for the vehicle, "$\rho$" is air density (kg/m$^3$), $C_D$ is aerodynamic drag coefficient for the vehicle, and $A_F$ is the vehicle frontal area (m$^2$), and "m" is the vehicle mass.

The component of power demand relating to a vehicle drag coefficient is $0.5\rho C_D A_F v^3$, which indicates that as the drag coefficient increases, the power demand increases. However, vehicle operation controls may be based upon powertrain optimization, and incorporating settings to achieve an optimal or improved fuel efficiency within the given parameters. When powertrain baselines controls are optimized with a baseline drag coefficient, changes in the drag coefficient may result in a less than optimum fuel efficiency because the underlying baseline drag coefficient may be no longer valid. Accordingly, a baseline powertrain configuration may provide either too much fuel to an engine, or too little, upon a different drag coefficient.

Figure 2:
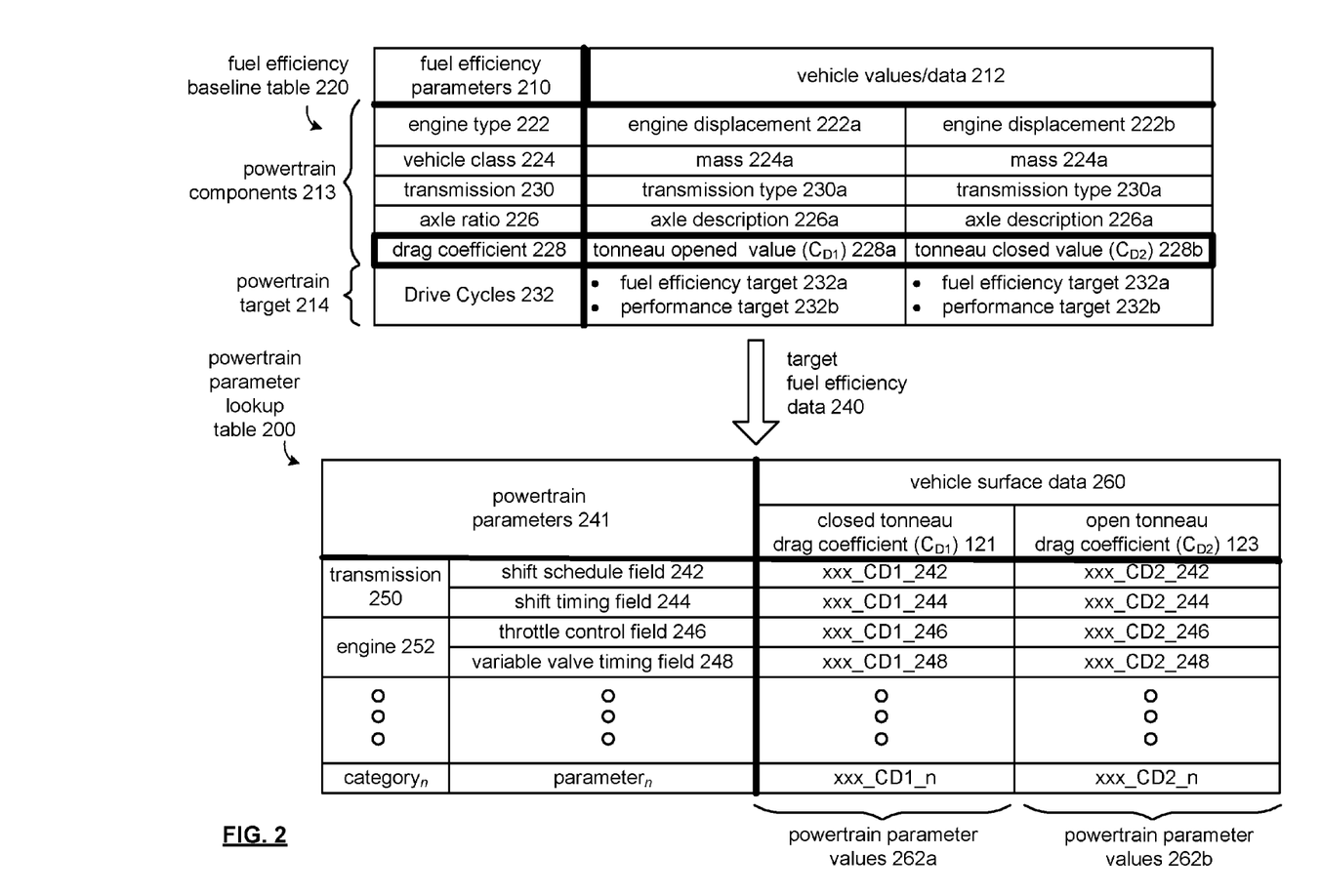
FIG. 2 is an example of a block diagram of a fuel efficiency baseline table and a powertrain parameter lookup table for use by a vehicle control unit of FIG. 1.

FIG. 2 is a block diagram of a fuel efficiency baseline table 220 and a powertrain parameter lookup table 200. The parameter lookup table 202 may be populated with target fuel efficiency data 240 generated by a fuel efficiency optimization based on the vehicle values/data 212.

The fuel efficiency baseline table 200 includes fuel efficiency parameters 210 including powertrain components 213 and a powertrain target 214. The powertrain components 213 may include engine type 222, vehicle class 224, transmission 230, axle ratio 226, and drag coefficient 228.

As an example, a light-duty truck may have an engine type 222 that includes a V-8, 4.6 L engine, a light duty truck class 224, a transmission 230 that is an electronic 6-speed automatic with overdrive, further including electronic control technology intelligence (ECT-i) for low-friction gear transfer technology, a sequential shift mode and uphill/downhill shift logic, an axle ratio 226 of 3.91 in the rear differential (that is, the link from the engine to the vehicle drive shaft), and a drag coefficient 228, which may be approximately 0.37.

As shown, the vehicle values 212 include data relating to the vehicle efficiency parameters 210. However, the drag coefficient 228 includes a tonneau opened value ($C_{D1}$) 228a, which represents the vehicle drag coefficient when the cover is opened or not deployed, as discussed earlier with regard to FIG. 1A, and a tonneau closed value ($C_{D2}$) 228b, which represents the vehicle drag coefficient when the cover is closed, or deployed, as discussed earlier with regard to FIG. 1C.

A target fuel efficiency data 240 may be generated for each of the tonneau opened value ($C_{D1}$) 228a, and tonneau closed value ($C_{D2}$) 228b.

The powertrain target 214 may include a fuel efficiency target standard, such as Federal Test Procedure (FTP75) for city driving cycles, which are a series of tests defined by the US Environmental Protection Agency (EPA) to measure tailpipe emissions and fuel economy of vehicles.

The powertrain target 214 includes a fuel efficiency target 232a. In sum, the example of the FTP75 provides targets for using as little fuel as possible of a defined drive cycle while maintaining a minimum performance threshold of ten seconds for a 0 to 100 kph acceleration time (the time it takes to reach 100 kph from a standing start).

Using the powertrain target 214 and the powertrain components 213, a model-based design may be used to generate the target fuel efficiency data 240.

Such a model design may include an engine model derived from engine mapping data (based on measured data, and statistical models to capture optimal spark advance, air-fuel ratio, intake cam phases, and exhaust phasing as a function of engine speed and load) for simulations of fuel consumption and torque production, the transmission including, for example, actuator, clutch, gear and shaft blocks, etc., and transmission controller data including fuel economy and performance shift schedules, the vehicle information (mass, drag coefficients $C_{D1}$ and $C_{D2}$), and a simulated autodriver. Examples of modeling tools include MATLAB® and Simulink®. As may be appreciated, in-vehicle testing may be used as well to develop the target fuel efficiency data 240.

The target fuel efficiency data 240 populates the powertrain parameter lookup table 200, which includes powertrain parameters 241 and vehicle surface data 260. The powertrain parameters 241 include, for example, transmission category parameters 250, engine category parameters 252, through category parameters n. The transmission parameter category 250 includes, for example, a shift schedule field 242, a shift timing field 244, etc. The engine parameter category 252 includes, for example, a throttle control field 246, a variable valve timing field 248, etc.

Values of the powertrain parameter lookup table 200 include accessing powertrain parameter fields based on vehicle surface data 260. As may be appreciated, the vehicle surface data 260 includes lookup indices based on multiple vehicle drag coefficients.

In the example of FIG. 2, the vehicle surface data 260 includes a closed tonneau drag coefficient ($C_{D1}$) 121 and an opened tonneau drag coefficient ($C_{D2}$) 123. As discussed above, these values may be determined under wind tunnel testing, or other suitable testing techniques. Also, a vehicle

100 may have various drag coefficient values; however, priority may be for those vehicle surfaces having a comparatively measurable effect on vehicle fuel efficiency.

Accordingly, referring briefly to the example of FIG. 1, the vehicle surface data 260 of FIG. 2 indicates powertrain performance values for the closed tonneau drag coefficient (CD1) 121, having associated powertrain parameter values xxx_CD1_242, 244, 246, 248 through xxx_CD1_*n*, and powertrain performance values for the opened tonneau drag coefficient (CD2) 123, having associated powertrain parameter values xxx_CD2_242, 244, 246, 248 through xxx_CD2_*n*. The respective powertrain parameter values provide optimization, or improved, fuel efficiency settings and/or control signals for operating the vehicle powertrain with a respective vehicle drag coefficient.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

As may be further appreciated, a vehicle drag coefficient may be dynamically determined based on sensor device data. That is, with various drag producing surfaces with the vehicle 100, a learned fuel efficiency may be realized. For further example, a controlled determination of a vehicle drag coefficient (such as wind tunnel testing) may depart in an actual environment at the onset, or over time. For example, tonneau covers though coming within a general category, may be different and behave differently. For example, tonneau covers may incorporate different materials with different native friction coefficients, have a different style (such as soft or hard, stackable or rollable), may deterioration from sun damage, lose rigidity over time, incur dirt and grime buildup, perform different in ice, rain, snow, etc.

Accordingly, the vehicle control unit 300 may learn to approximate or learn drag coefficient values for vehicle surface areas, and determine and apply powertrain parameters accordingly. In this manner, the vehicle control unit 300 may incorporate a deep learning system (such as a convolutional neural network (CNN), recurrent neural network (RNN), long short-term memory RNN, etc.) that includes (based on the example of tonneau covers) varying implementation data and likely resulting drag coefficient, and apply these to retrieval and/or generation of appropriate power train parameters.

Figure 3:
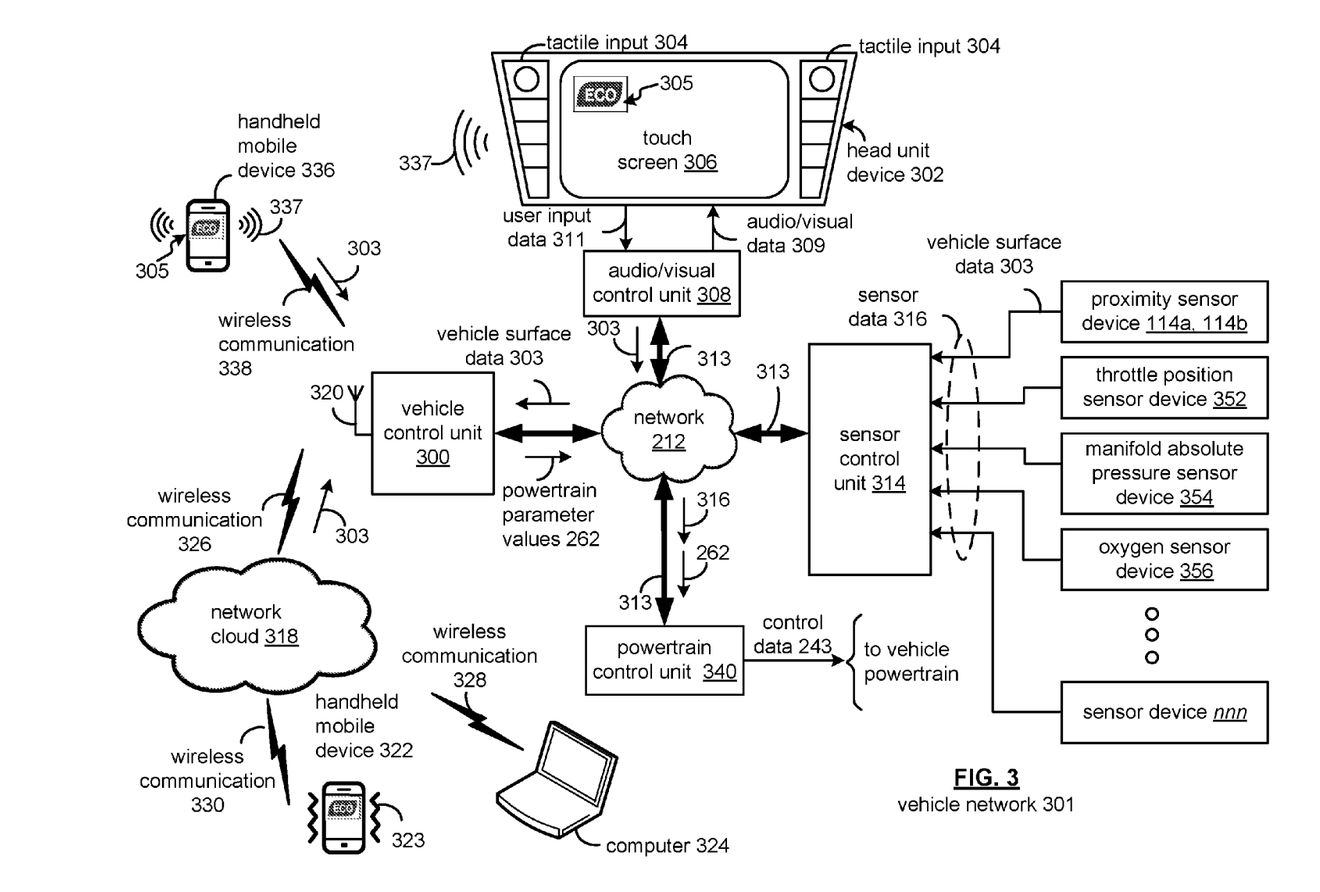
FIG. 3 is an example of a block diagram of the vehicle control unit of FIG. 1 in the context of a network environment.

Referring now to FIG. 3, is an example of a block diagram of the vehicle control unit 300 in the context of a network environment is provided. While the vehicle control unit 300 is depicted in abstract with other vehicular components, the vehicle control unit 300 may be combined with the system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 3, a vehicle network 301 may include the vehicle control unit 300, an audio/visual control unit 308, a sensor control unit 314, and a powertrain control unit 340, that are communicatively coupled via a network 312 and communication paths 313.

The vehicle control unit 300 may communicate with a head unit device 302 via a communication path 313 and network 312, and may also communicate with the sensor control unit 314 to access sensor data 316 from sensor devices 102, 352, 354, 356 and/or nnn. The vehicle control unit 300 may also be wirelessly coupled with a network cloud 318 via the antenna 320 and wireless communication 326, as well as via a wireless communication 338 to handheld user devices such as handheld mobile device 336 (for example, cell phone, a smart phone, a personal digital assistant (PDA) devices, tablet computer, e-readers, etc.).

In this manner, the vehicle control unit 300 operates to receive input data, such as sensor data 316, and provide data, to the head unit device 302 via the audio/visual control unit 308, to the sensor control unit 314, and to other devices that may communicatively couple via the network 318, such as computer 324, mobile handheld device 322 (for example, cell phone, a smart phone, a personal digital assistant (PDA) devices, tablet computer, e-readers, etc.).

The vehicle control module 200 and the audio/visual control unit 308 may be communicatively coupled to receive the sensor data 316 from the sensor control unit 314, including data values relating to fuel consumption information.

The vehicle control unit 300 may receive data such as vehicle surface data 303, which may indicate an altered vehicle surface area of the vehicle 100. In the present example, the vehicle surface data 303 may be provided by a moisture sensor activation data, which may be operable to remotely operate a tonneau cover to produce an altered vehicle surface having another vehicle drag coefficient. The vehicle surface data 303 may also be in the form of a proximity sensor data, such as via proximity sensor device 114*a* and/or 114*b*, as received via the sensor control unit 314 as sensor data 316, and provided to the vehicle control unit 300. The vehicle surface data 303 may be received from the head unit 302, such via the user input data 311 through the audio/visual control unit 308.

The vehicle surface data 303 may also be indicated by a remote user input operation by a vehicle user via the handheld mobile devices 322 and/or 336, computer 324, a combination of devices thereof, etc.

As discussed in detail herein, the vehicle control unit 300 operates to promote and/or improve fuel efficiency of the vehicle 100 through providing powertrain parameter values 262 based on vehicle surface data 303 indicating a transition of a vehicle drag coefficient from a first vehicle drag coefficient value, such as $C_{D1}$, which relates to a vehicle surface area 110 (see FIG. 1) to a second vehicle drag coefficient, such as $C_{D2}$, which relates to an altered vehicle surface area 118 (see FIG. 1).

The powertrain parameter values 262 may be based on promoting optimizing and/or improving fuel efficiency based upon different vehicle drag coefficients of the vehicle 100, as is discussed in detail with reference to FIGS. 3-5.

The visual indicators 305 may be provided via a conventional instrument cluster assembly of the vehicle 100, such as an indicator light (LED, LCD, backlit, etc.), graphic icon, etc., as well as per the head unit 302, handheld mobile devices 336, 322 and/or computer 324. An example of such a visual indicator 305 is an "eco driving indicator light" that illuminates during eco-friendly operation.

Still referring to FIG. 3, the audio/visual control unit 308 operates to provide, for example, audio/visual data 309 for display to the touch screen 306, as well as to receive user input data 311 via a graphic user interface. The audio/visual data 309 and input data 311 may include audio data, hands-free phone data, voice control data, navigation data, USB connection data, DVD play function data, multifunction meter function data, illumination signal data for the display 306 (such as dimming control), driving status recognition data (such as vehicle speed, reverse, etc. via sensor data 316), composite image signal data (such as via LiDAR sensor devices, cameras, etc.).

In FIG. 3, the head unit device 306 may include tactile input 304 and a touch screen 306. The touch screen 306 operates to provide visual output or graphic user interfaces such as, for example, maps, navigation, entertainment, information, infotainment, and/or combinations thereof.

The touch screen 306 may include mediums capable of transmitting an optical and/or visual output such as, for example, a cathode ray tube, light emitting diodes, a liquid crystal display, a plasma display, or other two dimensional or three dimensional display that displays graphics, text or video in either monochrome or color in response to display data 309.

Moreover, the touch screen 306 may, in addition to providing visual information, detect the presence and location of a tactile input upon a surface of or adjacent to the display. Additionally, it is noted that the touch screen 306 can include at least one or more processors and one or more memory modules to support the operations described herein.

The head unit device 302 may also include tactile input and/or control inputs such that the communication path 313 communicatively couples the tactile input to other control units and/or modules of the vehicle 100 (FIG. 1). The tactile input data may provided by devices capable of transforming mechanical, optical, or electrical signals into a data signal capable of being transmitted via the communication path 313.

The tactile input 304 may include number of movable objects that each transform physical motion into a data signal that can be transmitted over the communication path 313 such as, for example, a button, a switch, a knob, a microphone, etc.

The touch screen 306 and the tactile input 304 may be combined as a single module, and may operate as an audio head unit or an infotainment system of the vehicle 100. The touch screen 306 and the tactile input 204 can be separate from one another and operate as a single module by exchanging signals via the communication path 313 via audio/visual data 309 and/or user input data 311.

The head unit device 302 may be provide information regarding vehicle operation conditions based on display data 309 from the audio/visual control unit 308. Moreover, the graphics-based instrument cluster display, or may provide a such instrument cluster display to other monitor devices for the vehicle 100, such as a heads-up display (not shown), or to an instrument cluster in the vehicle dash assembly behind the vehicle steering wheel.

The audio/visual control unit 308 operates to receive user input data 311, and provides audio/visual data 309. The audio/visual data 309 may include operational information based on the sensor data 316, which may be provided for display to the vehicle user and/or passenger.

The sensor control unit 314 provides access to sensor data 316 for status of a vehicle surface area (via proximity sensor devices 114a, 114b), and status relating to powertrain operation for vehicle 100. The sensor devices may include a throttle position sensor device 352, a manifold absolute pressure sensor device 354, an oxygen sensor device 356, a sensor device nnn, etc.

The throttle position sensor device 352 operates to monitor a throttle valve position of an engine to determine the amount of air to allow into an engine. The throttle position sensor device 352 permits the powertrain control unit 340 to respond to changes in the amount of air, and to increasing or decreasing a fuel rate accordingly.

The manifold absolute pressure sensor device 354 operates to monitor air pressure in the intake manifold. The air pressure indicates the air amount being drawn into an engine to indicate a quantity of power the engine produces (for example, the more air, the lower the manifold pressure).

The oxygen sensor device 356 operates to compare oxygen level inside an exhaust manifold and in the air outside the engine to control a desired air/fuel ration to operate efficiently (for example, a desired ratio for gasoline powered engines may generally be considered as 14.7 parts of air to one part of fuel). That is, the oxygen sensor device 356 provides feedback to the powertrain control unit 340 to determine how rich or lean the air/fuel mixture is and to adjustment accordingly.

For example, regarding air/fuel ratios, when the mixture is "rich," or the engine has more fuel than needed (or more fuel than available oxygen), all available oxygen is consumed in the cylinder, and emission gases leaving through the exhaust manifold may contain almost no oxygen and are rich. Accordingly, the oxygen sensor device 356 provides a signal indicating this condition.

When, for example, a baseline drag coefficient is changed to a lower drag coefficient value (for example, due to improved vehicle drag coefficient $C_{D2}$), the emission gases indicate a "rich" mixture, and less than optimal combustion may be realized.

When, for example, a baseline coefficient is changed to a higher value (for example, due to larger vehicle drag coefficient), the emission gases indicate a "lean" mixture, and less than optimal combustion may be realized because there is more oxygen than fuel—that is, fuel is burned and extra oxygen leaves the cylinder and flows into the exhaust manifold. The oxygen sensor device 356 may correspondingly indicate this output.

Fuel delivery to an engine may largely be via fuel injectors, which deliver a fine mist of fuel to an engine's intake valves and combustion chambers, and the powertrain control unit, with a view towards a desired air/fuel ratio provides fuel injector spray patterns to effect the fuel delivery system.

For affecting fuel efficiency, the vehicle surface data 303 may indicate a transition of the vehicle drag coefficient, as discussed in detail by the example provided herein.

Further complicating operation of a vehicle powertrain, transmission controls (shifting, shift timing, etc.), may be configured to the baseline drag coefficient; however, though the engine may attempt to compensate for the expected or foreseen changes in the vehicle operation (for example, wind, terrain, road condition, friction with the roadway, etc.), a vehicle transmission may continue to provide controls in view of the baseline drag coefficient. As may be appreciated, though a vehicle drag coefficient may transition to a more efficient vehicle drag coefficient, as with an altered vehicle surface area, because the vehicle powertrain control parameters may be tuned to a baseline drag coefficient, a desired fuel efficiency may not carry over to the different, improved (or worsened) vehicle drag coefficient.

The powertrain control unit 340 may communicate with a head unit device 302 via a communication path 313 and network 312, and may also communicate with the sensor control unit 314 to access sensor data 316 from sensor devices 114a, 114b, 352, 354, 356 and/or nnn.

The powertrain control unit 340 may function to control internal combustion engine actuators to obtain a desired powertrain performance, and desired fuel efficiency. The engine control unit 340 operates to receive powertrain parameter values 262, which may be provided via the vehicle control unit 300. The powertrain control unit 340 receives the values 262, and generates control data 243 to effect the powertrain parameter values 262, which is provided to the vehicle powertrain.

As may be appreciated, the communication path 313 of the vehicle network 301 may be formed by a medium suitable for transmitting a signal such as, for example, conductive wires, conductive traces, optical waveguides, or the like. Moreover, the communication paths 313 can be formed from a combination of mediums capable of transmitting signals.

The communication path 313 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The wireless communication 326, 328 and/or 330 of the network cloud 318 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As is noted above, the vehicle control unit 300 may be communicatively coupled to a computer 324 via wireless communication 328, a handheld mobile device 322 via wireless communication 330, etc.

As described in detail herein, vehicle surface data 303 relating to transition of a vehicle surface area (such as opening, transitional, and/or closing a tonneau cover 112a/112b/112c, lowering/raising a tailgate 116, vehicle windows, etc.), may be provided to the vehicle control unit 300 from various applications running and/or executing on wireless platforms of the computer 324, the handheld mobile device 322 and 336, as well as from the head unit device 302 via the network 312.

The handheld mobile device 322 and/or computer 324, by way of example, may be a device including hardware (for example, chipsets, processors, memory, etc.) for communicatively coupling with the network cloud 318, and also include an antenna for communicating over one or more of the wireless computer networks described herein.

Figure 4:
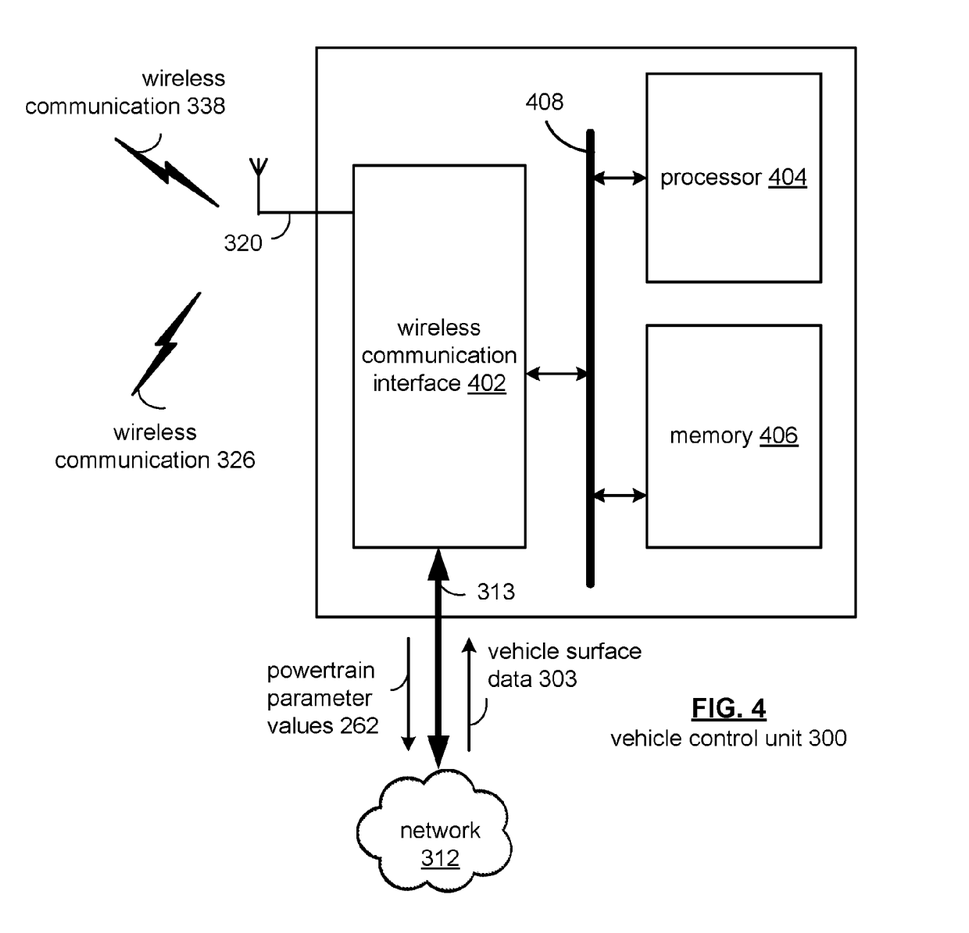
FIG. 4 is an example of a block diagram for a vehicle control unit.

FIG. 4 is a block diagram of a vehicle control unit 300, which includes a communication interface 402, a processor 404, and memory 406, that are communicatively coupled via a bus 408.

The processor 404 in the control unit 300 can be a conventional central processing unit or any other type of device, or multiple devices, capable of manipulating or processing information. As may be appreciated, processor 404 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 406 may be a single memory device, a plurality of memory devices, and/or embedded circuitry of the processing module 404. Such a memory device may be a read-only memory, random access memory, volatile memory, non-volatile memory, static memory, dynamic memory, flash memory, cache memory, and/or any device that stores digital information. The memory 406 is capable of storing machine readable instructions such that the machine readable instructions can be accessed by the processor 404. The machine readable instructions can comprise logic or algorithm(s) written in programming languages, and generations thereof, (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored on the memory 406. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 404 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 404 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 404 executes, hard coded and/or operational instructions corresponding to at least some of the steps and/or functions illustrated in FIGS. 1-5 to assess a nature of a vehicle acceleration and to provide near real-time feedback features and methods described herein.

The wireless communications interface 402 generally governs and manages the vehicle user input data via the vehicle network 312 over the communication path 313 and/or wireless communication 326. The communication interface 402 also manages controller unit output data such as display data and/or parking status data to the vehicle user. There is no restriction on the present disclosure operating on any particular hardware arrangement and therefore the basic features herein may be substituted, removed, added to, or otherwise modified for improved hardware and/or firmware arrangements as they may develop.

The sensor data 316 (see FIG. 3) includes capturing of intensity or reflectivity returns of the environment surrounding the vehicle, instantaneous vehicle speed data, and acceleration data for determining acceleration state for providing feedback to improve vehicle fuel efficiency. In general, data 316 captured by the sensors 114a, 114b, 352, 354, 356, and/or nnn and provided to the vehicle network 301 via the communication path 313 (see FIG. 3) can be used by one or more of applications of the vehicle to assess operational state(s) of the vehicle 100 based on powertrain parameter values 262.

The antenna 320, with the wireless communications interface 406, operates to provide wireless communications with the vehicle control unit 300, including wireless communication 326.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the vehicle control unit 300 may also be used as an acceptable architecture of the powertrain control unit 340, the audio/visual control unit 308, and/or the sensor control unit 314 (see FIG. 3). The control units 308, 314 and/or 340 may each include a communication interface or a wireless communication interface, a processor, and memory that may be communicatively coupled via a data bus. As may be appreciated, other architectures may be implemented, with similar functional capabilities.

The processors for the control units control units 308, 314 and 340 may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the display control units control units 308, 314 and 340 may be a single memory device, a plurality of memory devices, and/or embedded circuitry of the processor related to the control units control units 308, 314 and 340. Such a memory device may be a read-only memory, random access memory, volatile memory, non-volatile memory, static memory, dynamic memory, flash memory, cache memory, and/or any device that stores digital information.

Note that if the processor for each of the control units control units 308, 314 and 340 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor for each of the control units control units 308, 314 and 340 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor executes, hard coded and/or operational instructions corresponding to at least some of the steps and/or functions illustrated in FIGS. 1-5 to perform vehicle fuel efficiency operations responsive to an altered vehicle surface and methods described herein.

There is no restriction on the present disclosure operating on any particular hardware arrangement and therefore the basic features herein may be substituted, removed, added to, or otherwise modified for improved hardware and/or firmware arrangements as they may develop.

Figure 5:
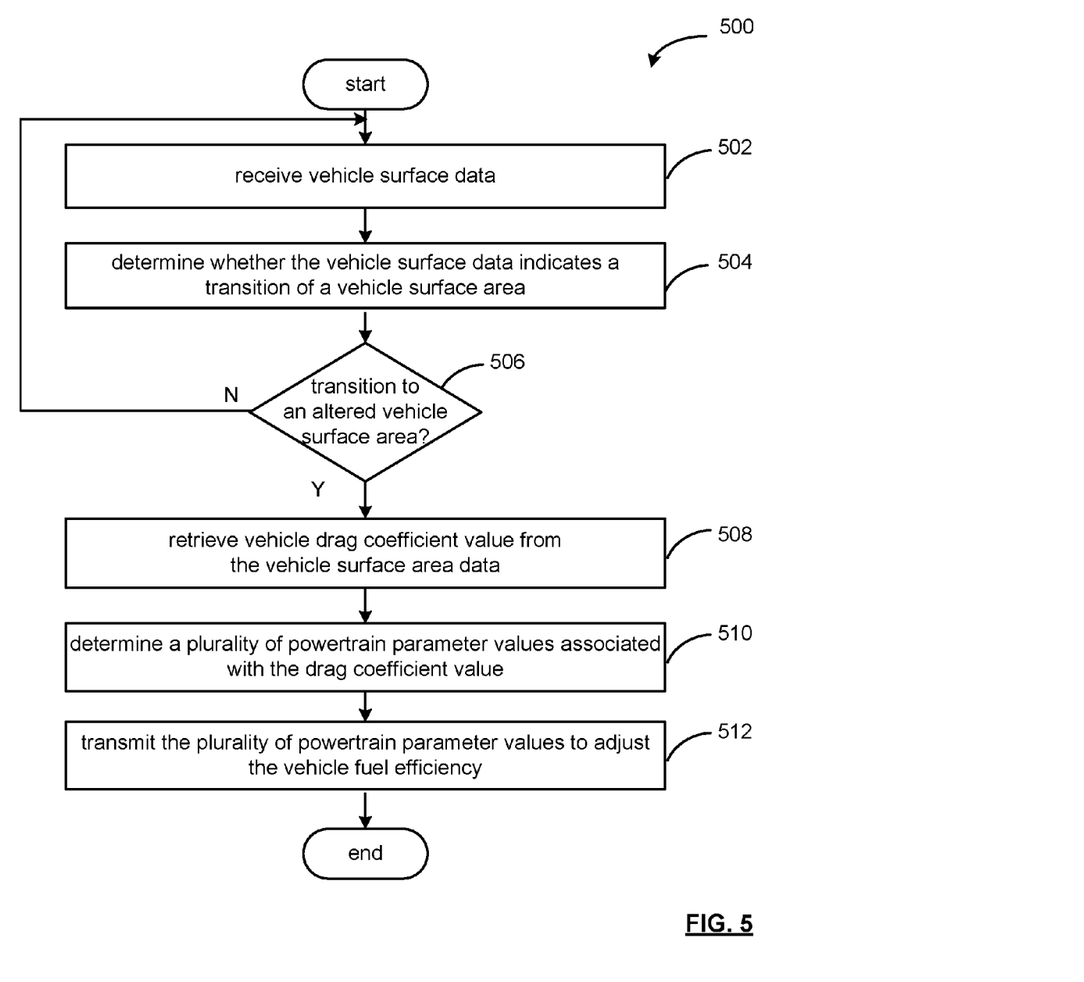
FIG. 5 shows an example process for adjusting a vehicle fuel efficiency responsive to an altered vehicle surface area.

FIG. 5 is an example process 500 in a vehicle control unit 3200 for adjusting a vehicle fuel efficiency responsive to an altered vehicle surface area for a vehicle 100.

At operation 502, the vehicle control unit 300 receives vehicle surface data. Examples of the vehicle surface data may relate to transition of a vehicle surface area (such as opening, transitional, and/or closing a tonneau cover 112a/112b/112c, lowering/raising a tailgate 116, vehicle windows, etc.). The vehicle surface data may be provided to the vehicle control unit 300 from various applications running and/or executing on wireless platforms, such as the computer 324, the handheld mobile device 322 and 336, as well as from the head unit device 302 via the network 312. Moreover, as may be appreciated, a console button may also be provided to allow remote operation, as well as deployment by hand, and sensed by proximity sensors, such as the example of the proximity sensor devices 114a and 114b of FIG. 1.

At operation 504, the vehicle control unit 300 determines whether the vehicle surface data indicates a transition of a vehicle surface area. For example, the vehicle surface data may indicate that a control has been depressed to open and/or close a vehicle surface, such as a tonneau cover, a window, etc. Also, the vehicle surface data may further confirm a position of the device to produce an altered vehicle surface area, and a corresponding drag coefficient.

In the example of a tonneau cover transition to either closed and/or opened, a period of time passes from an opened (or stowed) position of the tonneau cover, to one in which the proximity sensor devices 114b sense the closure of the tonneau cover (and vice versa). As may be appreciated, a transitional position for a vehicle surface may be recognized (such a tonneau cover), and further sensors may be deployed to determine a transitional position, and an associated vehicle drag coefficient.

At operation 506, when a transition occurs in a vehicle surface area, to produce an altered vehicle surface, the vehicle control unit 300 proceeds to retrieve a vehicle drag coefficient value from the vehicle surface area data at operation 508. When a transition is not determined and/or confirmed (or may be ambiguous due to being in transition), such as sensed by proximity sensor devices 114a and/or 114b, or lack an associated drag coefficient data value), the vehicle control unit 300 continues to receive (or poll) vehicle surface data at operation 502.

At operation 510, the drag coefficient value may operate as an index value into a powertrain parameter lookup table to retrieve a plurality of powertrain parameter values associated with the drag coefficient data. As may be appreciated, the drag coefficient value may be an index for a hierarchical table, or further, may be a pointer used to generate a plurality of powertrain parameters by the vehicle control unit 300. In this manner, a level of flexibility may be provided on a "best fit" level for providing vehicle performance parameters to a powertrain control unit. For example, a best fit may be based on a deep learning system (such as a convolutional neural network (CNN), recurrent neural network (RNN), long short-term memory RNN, etc.) that includes (based on the example of tonneau covers) varying implementation data and likely resulting drag coefficient, and apply these to retrieval and/or generation of appropriate power train parameters.

At operation 512, the vehicle control unit 300 may transmit the plurality of powertrain parameter values to adjust the vehicle fuel efficiency. In this manner, a powertrain control unit may receive the parameter values. For example, the power train parameter values may include transmission category parameters and engine category parameters, etc. The transmission parameter may include, for example, a shift schedule field, a shift timing field, etc. The engine parameter may include, for example, a throttle control field, a variable valve timing field, etc. In this manner, the vehicle control unit may adapt a vehicle fuel efficiency to the conditions of an altered vehicle surface.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing changes to a vehicle fuel efficiency based on an altered vehicle surface and corresponding changes in a drag coefficient.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a vehicle control unit for adjusting vehicle fuel efficiency to address an altered vehicle surface area, the method comprising:
  receiving vehicle surface data indicating a transition from a first vehicle drag coefficient value relating to a vehicle surface area to a second vehicle drag coefficient value relating to the altered vehicle surface area, wherein a first plurality of powertrain parameter values are associated with the first vehicle drag coefficient value;
  determining a second plurality of powertrain parameter values associated with the second vehicle drag coefficient value; and
  transmitting the second plurality of powertrain parameter values for the adjusting of the vehicle fuel efficiency.

2. The method of claim 1, wherein the first plurality of powertrain parameter values comprising at least two of:
  an engine throttle control parameter value,
  an engine variable valve timing (VVT) parameter value;
  a transmission shift schedule parameter value; and
  a transmission shift timing parameter value.

3. The method of claim 1, wherein the vehicle surface data comprising tonneau sensor data.

4. The method of claim 3, wherein the tonneau sensor data being provided by at least one of:
  a moisture sensor activation data operable to remotely operate a tonneau cover;
  proximity sensor data indicating a transition of the vehicle surface are;
  a user input operation by a vehicle user to operate the tonneau cover; and
  a remote user input operation by a vehicle user to operate the tonneau cover.

5. The method of claim 1, wherein:
  the first vehicle drag coefficient value being associated with an opened tonneau drag coefficient; and
  the second vehicle drag coefficient value being associated with a closed tonneau drag coefficient value.

6. The method of claim 1, wherein the determining the second plurality of powertrain parameter values associated with the second vehicle drag coefficient value comprising:
  accessing a powertrain parameter lookup table, wherein the powertrain parameter lookup table indexed by the second vehicle drag coefficient value; and
  retrieving the second plurality of powertrain parameter values associated with the second vehicle drag coefficient value.

7. The method of claim 6, wherein the second plurality of powertrain parameter values comprising at least two of:

an engine throttle control parameter value,
an engine variable valve timing (VVT) parameter value;
a transmission shift schedule parameter value; and
a transmission shift timing parameter value.

8. A method in a vehicle control unit for controlling vehicle fuel efficiency based on a plurality of vehicle surface area configurations, the method comprising:
receiving vehicle surface data including a vehicle drag coefficient value;
determining whether the vehicle surface data indicates a transition from a first vehicle surface area configuration to a second vehicle surface area configuration of the plurality of vehicle surface area configurations;
when the vehicle surface data indicating the transition:
retrieving the vehicle drag coefficient value from the vehicle surface data;
retrieve a plurality of powertrain parameter values associated with the vehicle drag coefficient value, wherein the plurality of powertrain parameters values are configured to optimize the vehicle fuel efficiency based at least in part on the vehicle drag coefficient value for the second vehicle surface area configuration; and
transmitting the plurality of powertrain parameter values for the controlling of the vehicle fuel efficiency.

9. The method of claim 8, further comprising:
receiving subsequent vehicle surface data including another vehicle drag coefficient value;
determining whether the subsequent vehicle surface data indicates another transition from the second vehicle surface area configuration of the plurality of vehicle surface area configurations to third vehicle surface area configuration of the plurality of vehicle surface area configurations;
when the another vehicle surface data indicates the transitioning:
retrieving the another vehicle drag coefficient value from the another vehicle surface data;
retrieve a subsequent plurality of powertrain parameter values associated with the another vehicle drag coefficient value, wherein the subsequent plurality of powertrain parameters values are configured to optimize the vehicle fuel efficiency based at least in part on the another vehicle drag coefficient value for the third vehicle surface area configuration; and
transmitting the subsequent plurality of powertrain parameter values for the controlling of the vehicle fuel efficiency.

10. The method of claim 8, wherein the plurality of powertrain parameter values comprising at least two of:
an engine throttle control parameter value,
an engine variable valve timing (VVT) parameter value;
a transmission shift schedule parameter value; and
a transmission shift timing parameter value.

11. The method of claim 8, wherein the vehicle surface data comprising proximity sensor data.

12. The method of claim 11, wherein the proximity sensor data being generated based on at least one of:
a moisture sensor activation data operable to remotely operate a tonneau cover;
proximity sensor data indicating a transition of the vehicle surface area configuration;
a user input operation by a vehicle user to operate the tonneau cover; and
a remote user input operation by a vehicle user to operate the tonneau cover.

13. The method of claim 9, wherein:
the first vehicle area configuration including an opened tonneau vehicle surface area configuration;
the second vehicle area configuration including a closed tonneau vehicle surface area configuration; and
the third vehicle area configuration including a transitional tonneau vehicle surface area configuration.

14. The method of claim 8, wherein the determining the plurality of powertrain parameter values associated with the vehicle drag coefficient value further comprising:
accessing a powertrain parameter lookup table, the powertrain parameter lookup table being indexed by the vehicle drag coefficient value; and
retrieving from the powertrain parameter lookup table the plurality of powertrain parameter values associated with the vehicle drag coefficient value.

15. A vehicle control unit for controlling vehicle fuel efficiency responsive to an altered vehicle surface area, the vehicle control unit comprising:
a wireless communication interface to service communication with a vehicle network and user equipment of a vehicle user;
a processor coupled to the wireless communication interface, the processor for controlling operations of the vehicle control unit; and
a memory coupled to the processor, the memory for storing data and program instructions used by the processor, the processor configured to execute instructions stored in the memory to:
receive, via the wireless communications interface, vehicle surface data indicating a transition from a first vehicle drag coefficient value to a second vehicle drag coefficient value, wherein a first plurality of powertrain parameter values being associated with the first vehicle drag coefficient value;
determine a second plurality of powertrain parameter values associated with the second vehicle drag coefficient value; and
transmit the second plurality of powertrain parameter values for the controlling the vehicle fuel efficiency.

16. The vehicle control unit of claim 15, wherein each of the first and the second plurality of powertrain parameter values comprising at least two of:
an engine throttle control parameter value,
an engine variable valve timing (VVT) parameter value;
a transmission shift schedule parameter value; and
a transmission shift timing parameter value.

17. The vehicle control unit of claim 15, wherein the vehicle surface data comprising tonneau sensor data.

18. The vehicle control unit of claim 17, wherein the tonneau sensor data being generated based on at least one of:
a moisture sensor activation data operable to remotely operate a tonneau cover;
proximity sensor data indicating a transition of the vehicle surface area;
a user input operation by a vehicle user to operate the tonneau cover; and
a remote user input operation by a vehicle user to operate the tonneau cover.

19. The vehicle control unit of claim 15, wherein:
the first vehicle drag coefficient value includes an opened tonneau vehicle drag coefficient value; and
the second vehicle drag coefficient value includes a closed vehicle tonneau drag coefficient value.

20. The vehicle control unit of claim 15, wherein the processor being further configured to execute further instructions stored in the memory to determine the second plurality of powertrain parameter values associated with the second vehicle drag coefficient value by:
  accessing a powertrain parameter lookup table, wherein the powertrain parameter lookup table indexed by the second vehicle drag coefficient value; and
  retrieving the second plurality of powertrain parameter values associated with the second vehicle drag coefficient value.

* * * * *

UNITED STATES PATENT AND TRADEMARK OFFICE
CERTIFICATE OF CORRECTION

PATENT NO. : 9,884,627 B1  
APPLICATION NO. : 15/224558  
DATED : February 6, 2018  
INVENTOR(S) : Sergei I. Gage and Arata Sato Page 1 of 1

It is certified that error appears in the above-identified patent and that said Letters Patent is hereby corrected as shown below:

Column 16, Line 47, the portion of Claim 4 reading:  
"are"  
Should read:  
--area--

Signed and Sealed this  
Twenty-seventh Day of November, 2018

Andrei Iancu  
*Director of the United States Patent and Trademark Office*